Nov. 30, 1965  D. W. COLEMAN  3,220,329
AUTOMATIC EXPOSURE CALIBRATION ADJUSTMENT
Original Filed July 19, 1962  2 Sheets-Sheet 1
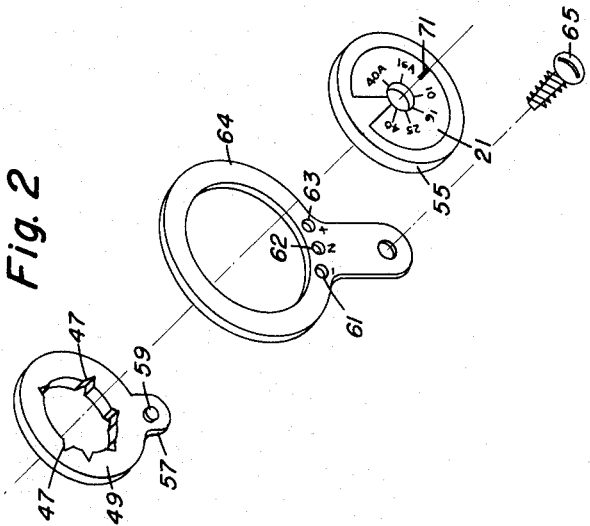
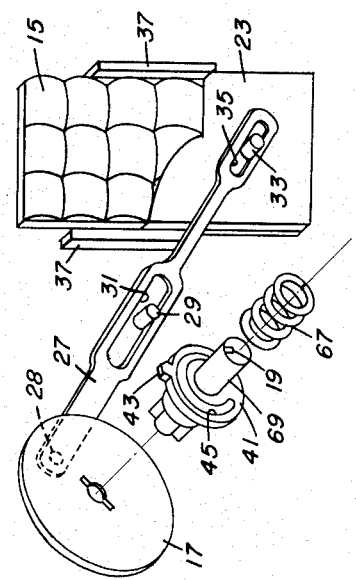
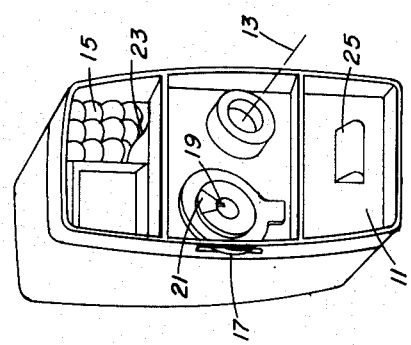
DONALD W. COLEMAN
INVENTOR.
BY R. Frank Smith
Robert W. Hampton
ATTORNEYS

United States Patent Office 3,220,329
Patented Nov. 30, 1965

3,220,329
AUTOMATIC EXPOSURE CALIBRATION ADJUSTMENT
Donald William Coleman, Rochester, N.Y., assignor to Eastman Kodak Company, Rochester, N.Y., a corporation of New Jersey
Continuation of application Ser. No. 211,051, July 19, 1962. This application Jan. 18, 1963, Ser. No. 252,415
4 Claims. (Cl. 95—64)

This is a continuation of my prior copending application Ser. No. 211,051, filed on July 19, 1962, now abandoned.

This invention relates to devices for regulating the automatic exposure of film in cameras and, more particularly, to the special calibration and control of such devices to compensate for the personal desire of the operator to slightly underexpose or slightly overexpose the photographs being taken.

What constitutes the "best" photograph among "acceptable" photographs is generally a matter of personal taste. This is particularly true in color photography, since many people prefer the more saturated colors of a slightly underexposed photograph, while others prefer the lighter hues which result with more exposure than "normal." With cameras in which the operator manually adjusts for exposure, it is a relatively simple matter to increase or decrease the camera aperture from the "normal" as determined by a separate light meter. However, with cameras in which exposure control is fully automatic, the camera's exposure setting is varied with scene brightness according to predetermined intensity-exposure value relationships. Since these predetermined relationships are "built-in" to the camera by the manufacturer, all exposure adjustments are made to assure "normal" exposure. With such prior art automatic exposure control cameras, the operator cannot adjust for this personal exposure preference.

The invention herein overcomes this problem by providing a device which can be easily and economically incorporated into most automatic exposure control systems to permit a simple adjustment of the system by the operator so that all automatically set exposures will reflect the operator's preference for normally exposed, underexposed, or overexposed pictures. The device is based upon a manual overdrive which may be used to introduce a predetermined bias into the camera's meter-movement calibration control. Such calibration controls are well known in the automatic exposure control art, and they are generally movable members whose setting (usually for "film speed") adjusts such devices as attenuator slides masking the camera's photocell, rheostats in series with the galvanometer coil, or the starting position of the entire meter movement. The manual overdrive according to the invention herein has three positions: "normal," which retains the manufacturer's calibration; a "minus" setting which causes all calibrated exposure values to be reduced by one-half exposure value unit; and a "plus" setting which causes all calibrated exposure values to be increased by one-half exposure value unit. By merely presetting the manual overdrive, the operator biases the camera's exposure control system to obtain the particular acceptable exposure which he prefers.

It is an object of this invention to provide a new and improved device for varying the calibration of automatic control systems for cameras.

It is a further object to provide a device that will permit the camera operator to vary the automatic exposure control calibration of a camera to assure photographs in accordance with the operator's personal taste for normal exposure, or slightly overexposure or slight underexposure.

It is another object to provide a simple and economical device for overdriving the calibration control of a camera's automatic exposure control system to cause the system to overexpose or underexpose by a pre-selected amount.

Other objects, purposes and characteristic features of the present invention will be in part obvious from the accompanying drawings, and in part pointed out as the description of the invention progresses. In describing the invention in detail, reference will be made to the accompanying drawings in which like reference characters designate corresponding parts throughout the several views, and in which:

FIG. 1 illustrates a simple movie camera incorporating the invention herein;

FIG. 2 is a partially exploded perspective drawing of certain camera parts pertinent to the disclosure of the invention herein.

Figure 3:
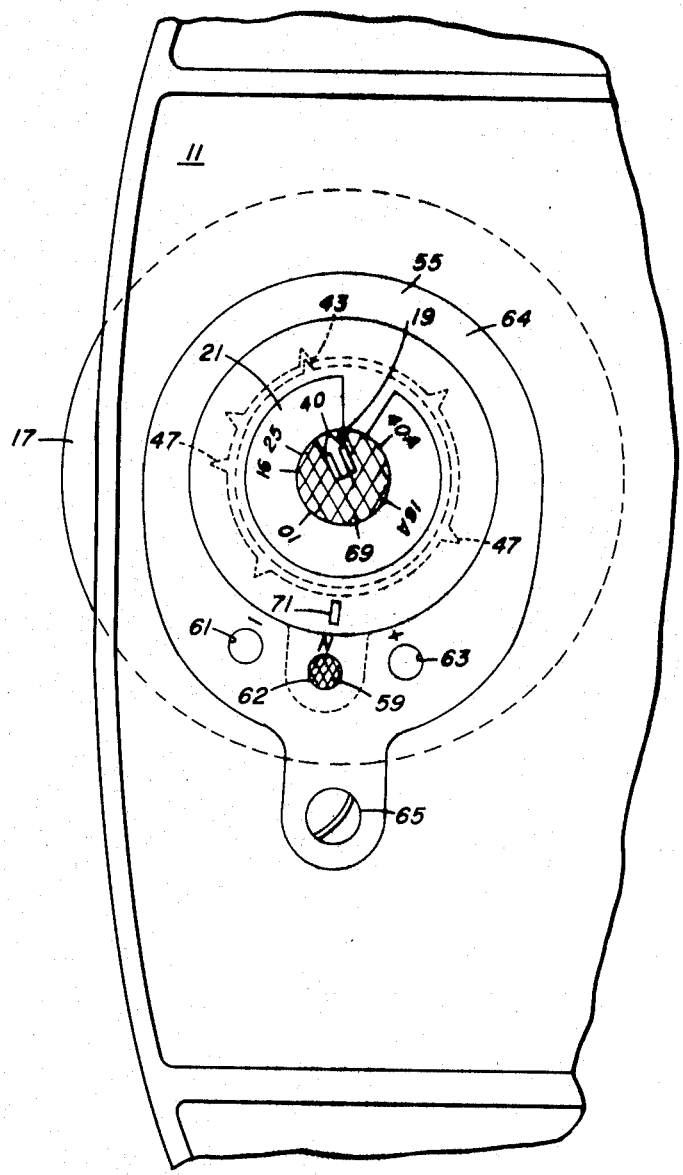
FIG. 3 is a plane view of the index stud, the dial face, and the calibrated scale of film speeds as they might appear on a camera utilizing the invention herein.

Although it will be apparent that the invention herein can be integrated with most automatic exposure control systems and can be applied equally to all types of cameras, the following disclosure will be limited to a description of a single application of the invention to a simple movie camera whose automatic exposure control system utilizes a masked photocell.

Referring now to FIG. 1, camera 11 is a simple movie camera of the fully automatic type. It has a picture-taking axis 13 on which are aligned the camera's lens system, shutter mechanism, and a variably controllable aperture. In the manner well known in the art, light from the scene being photographed strikes the diffusing face of photocell 15 to produce a current which varies in accordance with scene brightness, and this current is used to operate a galvanometer coil which in turn controls vanes which vary the size of the camera's aperture in accordance with the brightness of the scene. To compensate for the various speeds of different films that may be used in the camera, the operator rotates control disc 17 until indicator mark 19 aligns with the particular film speed on calibrated scale 21 that corresponds to the speed of the film being used in the camera. The adjustment for film speed by rotation of control disc 17 causes attenuator slide or mask 23 to move into a predetermined overlapping relation with photocell 15, assuring that, for any given scene brightness, greater exposure will be provided for slower speed films. When camera 11 has been set for "normal" operation, it operates similar to other prior art cameras of this general type, namely, the operator merely directs the camera at the scene to be photographed, depresses film drive control knob 25 and the camera's exposure system automatically provides the proper "normal" exposure of the film for the varying conditions of brightness in the scenes being photographed.

Referring now to the partially exploded perspective of FIG. 2, attenuator slide 23 is shown controlled by lever arm 27 which is pivotally mounted on pin 28 of control disc 17 and which engages pivot 29 with slot 31 and pin 33 of attenuator slide 23 with slot 35. As control disc 17 is rotated in a counterclockwise direction, the movement of lever arm 27 causes attenuator slide 23 to move up between guides 37 to mask photocell 15 in the manner well known in the art.

Indicator member 41 is appropriately keyed to control disc 17 and moves therewith. Indicator member 41 has a peripheral protrusion 43 which is made resilient in a radial direction adjacent protrusion 43 by the effect of slot 45. Protrusion 43 is designed to engage any of several detent slots 47 which appear on the inner circumference of overdrive ring 49.

Dial face 55 which carries calibrated scale 21, is illustrated as being separate from overdrive ring 49, but this has been done merely to facilitate explanation of the device; in actual practice dial face 55 would be secured to, or be part of the same unit as, overdrive ring 49.

Overdrive ring 49 has extending therefrom a finger 57 on which is mounted index stud 59. Index stud 59 is designed to cooperate with holes 61, 62 and 63 in locking plate 64 which is secured to the camera body by means of screw 65.

A spring 67 is axially mounted on shaftlike extention 69 of indicator member 41 and serves to bias the dial assembly, including overdrive ring 49 and dial face 55 in an axial direction tending to hold index stud 59 engaged to one of the holes 61, 62 and 63 in locking plate 64.

Locking plate 64 has its three holes 61, 62 and 63 marked "—," "N," and "+," and calibrated scale 21 on the face of dial face 55 carries index mark 71 which is aligned with one of the three just-named symbols in accordance with the particular hole in which index stud 59 is engaged.

The operation of this device is as follows: Referring to FIG. 3, upon loading film in the camera the operator rotates control disc 17 until indicator mark 19 is aligned with the particular number on calibrated scale 21 which corresponds to the speed of the film which has been loaded into the camera. The setting of control disc 17 occurs without the concurrent motion of overdrive ring 49 which is held in position by virtue of the engagement of index stud 59 with hole 62. During the setting of control disc 17, protrusion 43 is moved to another slot 47, the movement of control ring 17 overcoming the resilient bias of indicator member 41.

If the operator prefers that his photographs be made with "normal" exposure, he leaves the calibration unit in a position as illustrated in FIG. 3, namely, with index stud 59 in center hole 62 of locking plate 64, as indicated by the alignment of index mark 71 with the letter "N."

However, should the operator prefer photographs which result from a slight underexposure, he can preset the calibration unit to provide such uniform underexposure by merely depressing dial face 55 against the influence of spring 67 until index stud 59 disengages center hole 62. Then, holding the dial face in this depressed condition, he rotates it clockwise until index stud 59 is in alignment with lefthand hole 61 of locking plate 64, as will be indicated by the alignment of index mark 71 with the symbol "—." The distances between holes 61, 62 and 63 in locking plate 64 are preselected to require the rotation of control disc 17 through an arc equivalent to one-half an exposure value unit. Therefore, the clockwise rotation of the entire calibration unit as just described, causes control disc 17 to move so that attenuator slide 23 moves out of masking relation to photocell 15 in an amount equivalent to one-half an exposure value unit. As the result of this, for any given scene brightness, photocell 15 puts out a greater current, causing greater rotation of the galvanometer coil, and thereby resulting in a smaller aperture in a manner well known in the art.

Similarly, should the operator prefer his photographs taken under slightly overexposed conditions, he depresses dial face 55 and rotates the entire calibration unit in a counterclockwise direction until index stud 59 is aligned with righthand hole 63, as indicated by the alignment of index mark 71 with the symbol "+." This counterclockwise motion of the entire calibration unit including control disc 17 causes attenuator slide 23 to move to a position masking more of the surface area of photocell 15, thereby causing the automatic exposure control mechanism to respond with an aperture which is predetermined to result in an overexposure equivalent to one-half an exposure value unit.

Thus, by this relatively simple device, the camera operator can overdrive the camera's automatic exposure control system in accordance with his preference for normal exposures, underexposures, or overexposures. The setting of the camera is extremely simple from the operator's point of view, and the desired variation in exposure is automatically calibrated for all conditions of scene illumination.

It should be understood that only one specific embodiment of the present invention has been described herein, and that the particular form disclosed has been selected to facilitate the disclosure of the invention rather than to limit the particular form which the invention may assume. Further, it should be understood that various modifications, adaptations, and alterations may be applied to the specific form shown to meet various requirements of practice without in any manner departing from the spirit or the scope of the present invention.

I claim:

1. In a camera having a picture-taking axis and an automatic exposure control system for varying the light passing along said axis in accordance with scene brightness, said system including a calibrated control member movable to predetermined positions for manually adjusting the light intensity-exposure value response of said system in accordance with known variables to provide normal exposure of film used in said camera, the improvement comprising: overdrive means coupled to said control member and movable from a first position to either of a second position or a third position for driving said control member to a position altering the light intensity-exposure value response of said system by one-half exposure value unit above and below, respectively, the preselected normal exposure response as determined by an initial setting of said control member, the alteration causing a slight overexposure and slight underexposure, respectively, of said film.

2. In a camera having a picture-taking axis and an automatic exposure control system for varying the light passing along said axis in accordance with scene brightness, said system including a calibrated control member movable to predetermined positions for manually adjusting the light intensity-exposure value response of said system in accordance with known variables to provide normal exposure of film used in said camera, the improvement comprising: overdrive means coupled to said control member and movable from a first position to either a second position or a third position for driving said control member to a position altering the light intensity-exposure value response of said system by a predetermined amount above and below, respectively, the preselected normal exposure response as determined by an initial setting of said control member, the alteration being of such magnitude to cause a predetermined slight overexposure and slight underexposure, respectively, of said film, said overdrive means comprising: an adjustable overdrive member movable from said first position to either said second or said third position, resilient means connecting said overdrive member to said control member, spring means, an index stud fixed to said overdrive member; locking means for maintaining said overdrive member in any one of said first, second, and third positions, said locking means comprising a stationary plate having defined therein at least three apertures corresponding to said first, second and third positions, the apertures being provided for receiving said stud, said overdrive member being biased against said plate by said spring means, whereby said control member is movable with said overdrive member when the position of said overdrive member is changed.

3. In a camera having a picture-taking axis and an automatic exposure control system for varying the light passing along said axis in accordance with scene brightness, said system including a calibrated control member movable to predetermined positions for manually adjusting the light intensity-exposure value response of said system in accordance with known variables to provide normal exposure of film used in said camera, the improvement comprising: overdrive means coupled to said control member and movable from a first position to either of a predetermined second position or a predetermined third position for driving said control member to a position altering the light intensity-exposure value response of said system by less than one exposure value unit above and below, respectively, said preselected normal exposure response as determined by an initial setting of said control member, the alteration being of such magnitude to cause a predetermined slight overexposure and slight underexposure, respectively, of said film.

4. The camera according to claim 3 wherein said overdrive means comprises: an adjustable overdrive member movable from a first position to either of a second position and a third position, resilient means connecting said overdrive member to said control member; and locking means for maintaining said overdrive member in any one of said first, second and third positions following movement thereto; said control member being movable against said resilient means when said overdrive member is held immobile by said locking means, and said control member moving with said overdrive member when the position of said overdrive member is changed.

References Cited by the Examiner

UNITED STATES PATENTS

| | | | |
|---|---|---|---|
| 2,975,693 | 3/1961 | Ort | 95—64 |
| 3,087,395 | 4/1963 | Akahane | 95—64 X |

NORTON ANSHER, *Primary Examiner.*

EMIL G. ANDERSON, EVON C. BLUNK, *Examiners.*